(12) United States Patent
Nikhra et al.

(10) Patent No.: US 10,474,136 B2
(45) Date of Patent: Nov. 12, 2019

(54) DETECTION OF INTERCONNECTIONS BETWEEN CONTROL AND INSTRUMENTATION SYSTEMS

(71) Applicant: Honeywell International Inc., Morris Plains, NJ (US)

(72) Inventors: Abhishek Nikhra, Karnataka (IN); Manas Dutta, Karnataka (IN); Ramakrishnan Ganapathi, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 673 days.

(21) Appl. No.: 15/177,951

(22) Filed: Jun. 9, 2016

(65) Prior Publication Data

US 2017/0357245 A1  Dec. 14, 2017

(51) Int. Cl.
G05B 19/414 (2006.01)
G05B 19/05 (2006.01)
G05B 19/418 (2006.01)

(52) U.S. Cl.
CPC .......... *G05B 19/414* (2013.01); *G05B 19/05* (2013.01); *G05B 19/41885* (2013.01); G05B 2219/31334 (2013.01); G05B 2219/31343 (2013.01); Y02P 90/16 (2015.11); Y02P 90/185 (2015.11); Y02P 90/26 (2015.11)

(58) Field of Classification Search
CPC ............................. G05B 19/05; G05B 19/414; G05B 19/41885; G05B 2219/31334; G05B 2219/31343; Y02P 90/16; Y02P 90/185; Y02P 90/26

USPC .......................................................... 709/223
See application file for complete search history.

(56) References Cited

U.S. PATENT DOCUMENTS

| 5,796,606 | A | 8/1998 | Spring | |
|---|---|---|---|---|
| 10,148,519 | B2 * | 12/2018 | Dutta | ...................... H04L 41/12 |
| 10,296,515 | B2 * | 5/2019 | Nikhra | .................... G05B 19/00 |
| 2002/0077711 | A1 | 6/2002 | Nixon et al. | |
| 2010/0077078 | A1 | 3/2010 | Suit et al. | |
| 2010/0271989 | A1 * | 10/2010 | Chernoguzov | .. G05B 19/41855 370/310 |
| 2012/0084062 | A1 * | 4/2012 | Maturana | ............ G06F 17/5022 703/6 |

(Continued)

FOREIGN PATENT DOCUMENTS

EP  1865413 A1  12/2007

*Primary Examiner* — James E Springer (57) ABSTRACT

A method of automatically determining interconnections between control and instrumentation (C&I) systems within an industrial facility (IF). A data collection system including a data collection algorithm that provides a data collection block and a data agents block is coupled to the IF which has C&I systems collectively utilizing different data formats each including C&I devices, where the C&I systems are coupled to field devices coupled to processing equipment configured for implementing an industrial process. A data collection process is initiated using respective data formats for obtaining engineering configuration data used in the C&I systems stored therein. The engineering configuration data from each C&I system is used to determine connections within and interconnections between the C&I systems. The format of the engineering configuration data can be converted to common format engineering configuration data and then be stored.

14 Claims, 6 Drawing Sheets

(56) References Cited

U.S. PATENT DOCUMENTS

| | | | |
|---|---|---|---|
| 2015/0156072 A1 | 6/2015 | Kirrmann | |
| 2016/0098388 A1* | 4/2016 | Blevins | G06F 17/30569 |
| | | | 707/755 |
| 2016/0099863 A1* | 4/2016 | Messinger | H04L 41/145 |
| | | | 370/218 |
| 2016/0274978 A1* | 9/2016 | Strohmenger | G05B 13/04 |
| 2017/0336947 A1* | 11/2017 | Bliss | G06F 3/04842 |
| 2017/0351226 A1* | 12/2017 | Bliss | G05B 13/042 |

* cited by examiner

DETECTION OF INTERCONNECTIONS BETWEEN CONTROL AND INSTRUMENTATION SYSTEMS

FIELD

Disclosed embodiments relate to determining control and instrumentation system interconnections in an industrial facility such as a manufacturing plant or refinery.

BACKGROUND

A manufacturing plant or refinery (an "industrial facility") may have several Control & Instrumentation (C&I) systems including one or more distributed control systems (DCSs), a programmable logic controller (PLC), a safety system, and applications for controlling its different processes. These C&I systems may be provided by different vendors. The C&I may have interdependencies by virtue of connections and references between respective C&I system elements.

Some examples of C&I system elements are tags which are identifiers (e.g., a name) for specific data points, logical items, and hardware items such as 110 modules, and controllers. Connections between C&I system elements can be logical where data transfer is accomplished by data protocols including Open Process Control (OPC), serial (e.g., Serial Peripheral Interface (SPI)) or MODBUS. Connections can also be physical (e.g., using 10 devices) including wiring (or cable) connections for the data transfer. The elements in the C&I system can be referenced in human-machine interaction (HMI) displays, a history or a trend.

In modern plant engineering, C&I systems include C&I devices that link all plant components (processing units to their C&I system, and between respective C&I systems). The C&I devices include 110 modules that generally receive physical parametric (e.g., pressure, temperature) representations from sensors as standard current signals (4 mA to 20 mA). These signals are utilized by other various C&I devices including for regulating, safety, data acquisition and comparator systems for control, safety and instrumentation purposes. Specifically, conventionally various comparators compare the incoming 4-20 mA signals received from sensors against stored/set "set points" and create outputs used for plant safety, regulation, interlock or/and operation. When a C&I device goes down for maintenance, it is important to understand the usage of that device throughout all the associated C&I systems in the plant to identify and assess the impact of the proposed change. The impact assessment helps in ensuring that no process outage happens when the C&I device is undergoing maintenance or replacement.

Determination of interconnections between C&I systems and within C&I systems is conventionally performed manually to generate C&I system documentation. During IF troubleshooting of a process problem, such as a process upset, it is generally important to reference the system documentation to find the connections needed to understand how the different C&I devices are interconnected. Especially during trip analysis multiple level of dependencies need to be analyzed to establish the end-to-end data flow to solve process problems.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize knowledge of the physical or logical interconnections between the control & instrumentation (C&I) systems in an industrial facility (IF, or a "plant") that enable data flow between the C&I systems is needed to control various processes in the IF for troubleshooting process problems. As used herein a C&I system and control system are synonymous. The flow of cross C&I system data adds interdependencies between the C&I systems which are recognized to be needed to be understood to perform maintenance, replacement or trip analysis. In the absence of up-to-date system documentation that has the capability to identify the C&I interconnections, the C&I interconnections are difficult to find which directly impacts the problem resolution time.

It is also recognized such interdependencies or connections between devices in an IF are generally not always part of a single C&I system (e.g., C&I systems including one or more DCS, PLC, and a safety instrumentation system), so as a result it generally requires consolidation of information from multiple C&I systems (which typically have different data formats) to establish the connectivity between the C&I systems. Since the determination of interconnections between C&I systems is conventionally performed manually, doing so is time consuming and error prone. The interconnections may also undergo several changes over a period of time creating the need to manually re-determine the interconnections between the C&I systems.

Disclosed embodiments include methods of automatically determining interconnections between C&I systems within an IF. The IF includes a plurality of C&I system collectively utilizing at least two different data formats including a plurality of C&I devices, where the C&I systems are coupled to field devices which are coupled to processing equipment configured for implementing an industrial process. A data collection system comprising a data collection algorithm stored in a memory implemented by a processor that provides a data collection block and a data agent block is coupled to the IF. When prompted by a user the data collection system initiates a data collection process for obtaining engineering configuration data used and stored in the C&I systems. The engineering configuration data from each of the C&I systems is used to determine connections within each C&I system and interconnections between the respective C&I systems.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

As used herein an IF refers to a plurality of C&S systems including a DCS(s), PLC, safety system and application-based C&I that are used for controlling different processes run in the IF. As described below, disclosed data parsers and data agents have the data format and syntax information used in their respective C&I system built or coded therein to enable collecting engineering configuration data for disclosed C&I system documentation including the interconnections between C&I systems. This data format and syntax information can be gathered from highly skilled individuals that perform detailed analysis of the respective C&I system during development of each parser that enables retrieving the engineering configuration data from their respect C&I system.

As recognized herein, the engineering system configuration data is stored as system configuration data in a common information system or one or more repositories (memories, typically associated with a server) in the respective C&S systems. In contrast to conventional manually determining C&I system interconnections, disclosed documentation systems automatically determine the C&I system interconnections without the need for any additional inputs from the end user.

The devices in the C&I systems in the IF can have interconnections to exchange data and control which is represented by a connection. The connections between two devices may be a physical connection (e.g., by an IO device) or by a logical connection. A network connection between a controller and a server is an example of physical connection. A connection between two control logic elements to exchange data is a logical connection. Devices referenced in the HMI displays and applications represents another category of connections referred to herein as references (reference connections). HMI displays are used for operator monitoring. Such displays show parameter values of devices which are being monitored. The term reference connection or reference is used herein to describe that device values are being referenced in the display. For any reason if the device is taken for down maintenance or replacement the connections or reference connection provide the impact that generally needs to be considered.

Disclosed data collection systems can provide a tag reference (TR) search feature that enables finding the references or connections in which a tag associated with an object (e.g., a server in one of the C&I systems) is used or bound. The tag name of the object is input to the TR search. The results of the TR search can be presented in a graphical and/or tabular format (see FIGS. 3A-D described in the Examples section below). The graphical format in the graphical view (see FIG. 3A described below) pictorially shows the connections and data flow between the devices. The documentation system uses the upstream and downstream connotations to describe the ends of the connection. The data flows from upstream to downstream. In the graphical view additional properties and legends are shown along with the connection ends. In the connection ends the information is added to describe the tag system to which it belongs, controller where it is running. The upstream and downstream ends have additional details including the system, controller and area that helps a user to understand and locate the end involved in the connection. Additional information about the connection including protocol, rate of data exchange, physical medium, and communication path can also be presented as part of the result set.

The graphical view of the search result provides navigation and pinning of blocks. With navigation one can traverse through upstream or downstream end to identify the connections a respective end is involved. The pinning of certain blocks and connections ensures that those blocks are always shown during navigation. The pinning and drill down navigation can be important to understand the end-to-end impact. A user can utilize the graphical view in the following two example scenarios:
(1) During trip analysis the navigation and pinning of blocks allow end-to-end analysis of data flow. Pinning helps in keeping only those blocks that are important for the analysis.
(2) The graphical view also helps in identifying end-to-end impact analysis of making a change to a certain tag or field device. Through the graphical view and navigation through this view it generally becomes easy to find the data flow.

A tabular view (see FIG. 3B, 3D described below) provides interconnection information shown in the graphical view in a tabular format. Additionally, the tabular view provides history, HMI and script references as their representation in graphical view can clutter the representation and make it difficult to understand the control logic. The information present in the graphical and tabular view can be exported and used for additional analysis or reports.

Disclosed systems also provide the feature of detecting changes in the interconnections between C&I systems. A change record can be stored along with the timestamp indicating when each interconnection between C&I systems was detected. The change record provides a mechanism to view the interconnection change history and associated reasons and description of the changes. A common format is followed for this step where the collected data is converted and stored (As described below it is stored in the memory 130a of the data server 130 in FIG. 1) in common format by a disclosed data parser in a step before the interconnection between C&I system changes is (or are) detected.

Figure 1:
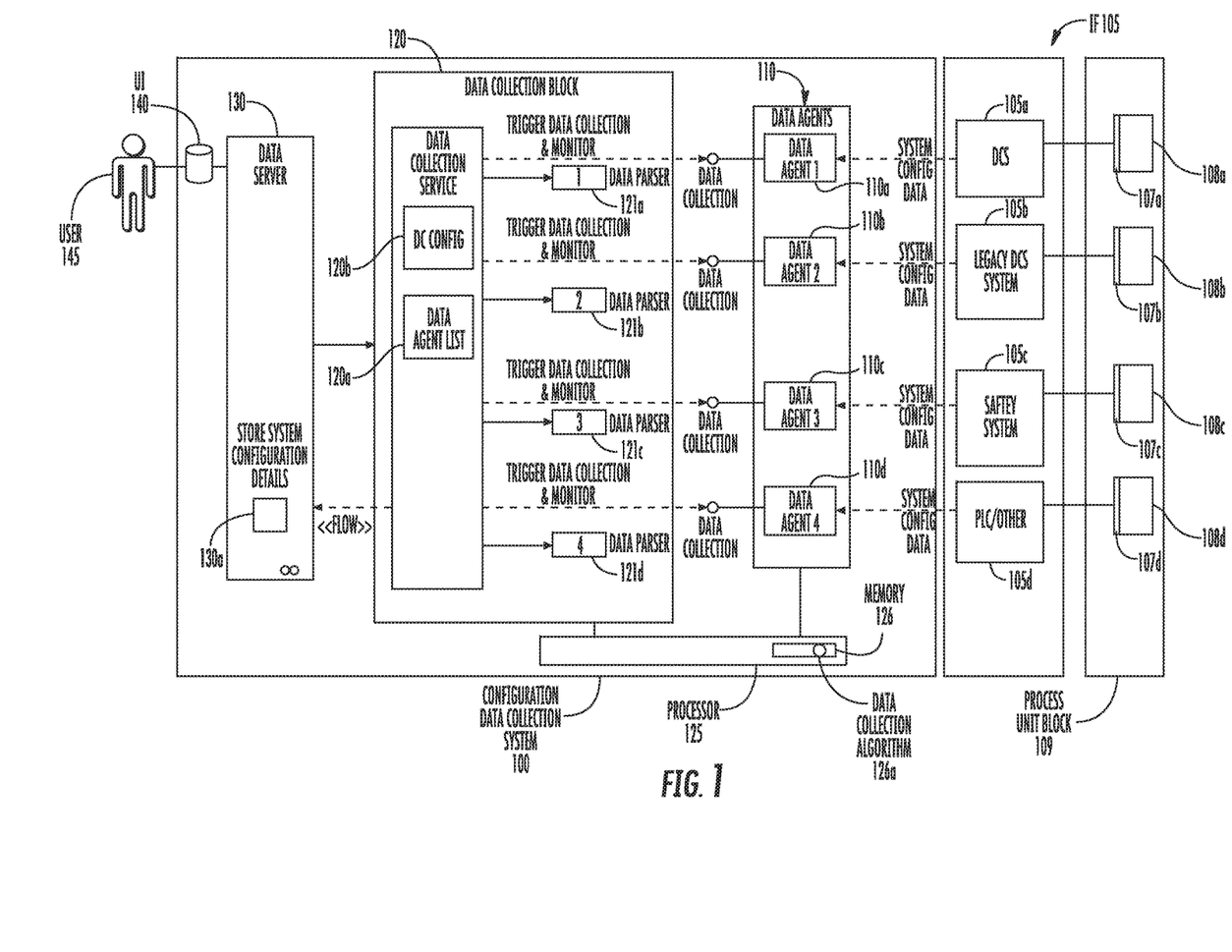
FIG. 1 shows an example data collection system that automatically determines inter-connections between the different C&I systems in an IF, according to an example embodiment.

FIG. 1 shows an example data collection system 100 that from collected engineering configuration data obtained from repositories in the C&S systems automatically determines interconnections between the different C&I systems in an IF 105. IF 105 comprises the blocks shown in FIG. 1 including the application data server 130, C&I systems 105a-d, and the process unit block 109 controlled by the C&I systems 105a-d, as well as many other elements within the IF that are not shown. Interconnections within each C&I system are also derived from collected engineering configuration data.

IF 105 is shown including a plurality of C&I systems including a first DCS 105a, a legacy DCS 105b, a safety system 105c (including safety controllers, and network interface modules (NIMs)), and Programmable Logic Controller (PLC) or other controller 105d. As known in the art, the DCS 105b and PLC 105d each include at least one process controller, and at least one input/output (I/O). A PLC is generally used for control of small package processing equipment items such as compressors, and pumps. A PLC comprises a PLC controller along with related IO modules. The IF 105 includes at least one (and in some cases all) of first DCS 105a, legacy DCS 105b, safety system 105c, and PLC or other controller 105d.

The process unit block 109 includes processing equipment 108a, 108b, 108c and 108d (boilers, compressors, and pumps) configured for implementing an industrial process, a plurality of field devices (actuators and sensors, such as for sensing temperature and pressure) shown as 107a, 107b, 107c and 107d coupled to a respective C&I system 105a, 105b, 105c and 105d. As noted above, the C&I system devices include I/O modules that generally receive physical parametric (e.g., pressure, temperature) representations from sensors, and other C&I devices use these representations for regulating, safety, data acquisition and comparator systems for control, safety and instrumentation purposes.

Data collection system 100 includes a data agents block 110 shown including data agents associated with each C&I including data agent 1 110a, data agent 2 110b, data agent 3 110c and data agent 4 110d, shown receiving system configuration data from the first DCS 105a, legacy DCS 105b, safety system 105c, and PLC or other controller 105d, respectively. The respective data agents (110a, 110b, 110c and 110d) each have the knowledge of the respective C&I system that they are associated with from which the network configuration (or topology) needs to be collected including the network type used (e.g., Ethernet, fault tolerant Ethernet (FTE), a Local Control Network (LCN) or a wireless network) and the communication method (such as described below) used by the C&I system. The network type and communication method used by each C&I system 105a-105d are generally stored by each system differently, such as in one or more engineering repositories. Disclosed data agents extract these information from their respective C&I system along with the references.

Data collection system 100 generally has some configuration information provided during initial setup by the user (called "data collection setting") that includes knowledge of the nodes and configuration about the C&I system including connectivity details (e.g., host name or IP address of the server where engineering configuration database is stored, name of share where the display files are stored) and credentials (for security purposes) to connect to the system to their respective data agents (110a, 110b, 110c and 110d). Using this configuration information provided from the data collection setting, data collection system 100 responsive to a user request will initiate a disclosed collecting data process. In case of EXPERION the communication method is star-based Fault Tolerant Ethernet (FTE), in case of TPS/Protocol Conversion Application (PCA) it is a physical bus/logical ring token pass-based communication. The data agents 110a-110d in the data agents block 110 are responsible for discovering the respective nodes in the network, the interconnection of the nodes in the C&I system that they are associated with, and the interconnections between the C&I systems.

Each C&I system (DCS 105a, legacy DCS 105b, safety system 105c, and PLC or other controller 105d) may employ one or more network types which can be standard networks such as Ethernet or a propriety communications network. The data agents 110a-d have knowledge of the C&I system whose engineering configurations are being collected for system documentation of the C&I system data (as noted above obtained from one or more engineering repositories, typically associated with servers) from which connections and references needs to be collected. In this case, disclosed data agents 110a-d may use different discovery methods for different C&I systems, as well as different methods are used to discover and collect data. Data agents block 110 is remotely executed, such as executing from a control room or in satellite rack room (SRR) in the IF 105. The data agents block 110 can be developed in a technology that is compatible with the technology platform (e.g., some DCS systems might be running on a different operating system (OS) such as LINUX, UNIX, etc.), so that the respective data agents 110a-d are each compatible with the operating system of the particular C&I system they are associated with. New data agents for the data agents block 110 can be developed and deployed to support the release of a new C&I system.

Data collection system 100 includes a data collection block 120. The data collection block 120 is responsible for starting and tracking the actual data collection service activity of the C&I system provided by the data agents block 110. The data collection block 120 includes a data agent list 120a that stores a list of all data agents 110a-110d which are registered with data collection system 100, and which of the data agents is applicable for a particular C&I system along with the version of that C&I system. The data collection block 120 includes data collection (DC) configuration block 120b which stores a list of the C&I systems from which engineering configuration data needs to be collected, connectivity information to be used to connect to the C&I systems, and credentials needed to access the C&I system, for security to be used by the data agents in data agents block 110 to obtain access to the C&I system data. The data collection block 120 also includes data parsers 121a-121d that operate after the data agents 110a-d have collected configuration data regarding their respective C&I system.

For each C&I system (105a-105d) the data collection block 120 starts the respective data agent 110a, 110b, 110c, 110d in the data agents block 110. Data collection block 120 starts a data parser (121a, 121b, 121c, 121d) after the respective data agents 110a, 110b, 110c, 110d have collected data from their associated C&I system. The data parsers 121a-d have knowledge of the data format and syntax of the data used in the C&I system. The data parsers are responsible for parsing and converting connections and references in C&I system format into a common format which is stored in the information system which is represented as memory 130a of the data server 130 in FIG. 1.

Data parsers 121*a-d* store all the connections (including physical and logical connections, where network connections are type of physical connection) that are found in the C&I systems and interconnections between C&I systems in an "unresolved references" database in the memory 130*a* of the data server 130. For each connection, information about the two ends of the connection are also stored. This information about the two ends of the connection helps in locating and resolving a tag of user interest. As described below, the unresolved connections can be later processed by a disclosed "connection resolver phase" algorithm to resolve these connections where details of the connections obtained help in understanding if the connection is internal (within the system) or external (between systems).

The communication mechanism between the data collection block 120 and data agents 110*a*-110*d* is generally not fixed. The data collection block 120 thus may use different communication mechanism to invoke and control different data agents 110*a*-110*d*. The communication mechanism generally depends on the platform of the target system and technology in which data agent 110*a*-110*d* is developed.

The data collection block 120 and data agents block 110 are both generally implemented by a processor 125 having associated memory 126 that stores a disclosed data collection algorithm 126*a* run by the processor 125. The processor 125 can comprise a microprocessor, digital signal processor (DSP), or microcontroller unit (MCU). A user 145 is shown at a user interface (UI) application 140 (such as in a control room) which upon an input by the user initiates an engineering configuration data collection request to the data collection block 120.

The common generic format has representations for objects, connections and associations found in IFs. Objects have attributes that identify and describe them. Objects can be physical entities including Controllers, PLCs, Chassis, Racks, I/Os, Servers, Workstations or switches. Another set of objects is logical entity including installed application, control logic, batch control, ladder logic, safety logic, history references or human machine interface (HMI) references. The objects can be connected to exchange data and control, these are represented by connections. The connections represent a physical connection or a logical connection between two objects. Network connection between a controller and a server is an example of physical connection. Connection between two control logic to exchange data represents logical connection. The common generic format to store engineering configuration enables a single information source being used to store configuration data collected from different C&I systems. Additionally, a common format can be applied across the various C&I systems leads to uniform engineering and maintenance practices.

Data server 130 represents the information system and includes a memory 130*a* that stores the system configuration data collected from the various C&I systems. It guarantees the atomicity (where at any point if the collected has any error it is not persisted by the information system so that stored does not overwrite or corrupt other data stored), consistency, isolation and durability of collected snapshot system configuration data. The data server 130 provides the necessary interfaces so that can be used by an application server to access the stored system configuration data.

As described above, a resolver inter-connection phase algorithm for determining the ends involved in the network connections implemented by the data collection block 120 can be used to resolve the unresolved connections. The resolver inter-connection phase is generally triggered after the system configuration data details are collected and stored for all of the C&I systems. The resolver inter-connection algorithm goes through all the network connections stored in the "unresolved references" database in the memory 130*a* of the data server 130. The connection resolution process can include the following three (3) passes:

Pass 1 resolves connections where both ends of the connection are within one single C&I system. Tags associated with two ends are located (from data collected from the C&I systems stored in the memory 130*a* of and in the Data Server 130) using the additional information added for unresolved connections, such as details of the connection including the communication protocol, physical medium, and rate of data transfer which can clarify the data transfer.

Pass 2 of connection resolution is started after pass 1, and is completed for all C&I systems (from data collected from the C&I systems stored in the memory 130*a* in the Data Server 130). This pass resolves the connections that are between two different C&I systems. Some passes can be reusable, what matters is that in Pass 2 only one handler is called to resolve a connection. Pass 3 described below can call several of them until a connection is resolved or it reaches a point where it cannot resolve anymore These connections between two C&I systems may be termed "external references". Each unresolved connection may need separate processing logic to identify and resolve the connection ends. The resolution logic depends on the how the system internally organizes the connections. The resolution logic also depends on the connection type, for example if the connection type is ModBus or OPC. Logic to resolve a connection in a system and a connection type is provided by a component referred to herein as a "Connection Handler". Different connection handlers can be created for different combinations of system and connection types. To resolve connection ends, a matching handler is picked which identifies the system and the tag involved. As described above, any unresolved connections at this stage can be added to an "unresolved references" database in the memory 130*a* of the data server 130.

Pass 3 is started after pass 2 of the connection resolution is completed for all C&I Systems. This pass resolves the connections that are between two different C&I systems (where the data path goes through multiple C&I systems). These types of connections are also referred as "Multi-Hop connections". For each unresolved connection a recursive loop is started which continues to resolve next system and tag using the appropriate handler until the connection is fully resolved with an end tag or it is determined it cannot resolve the end.

Figure 2:
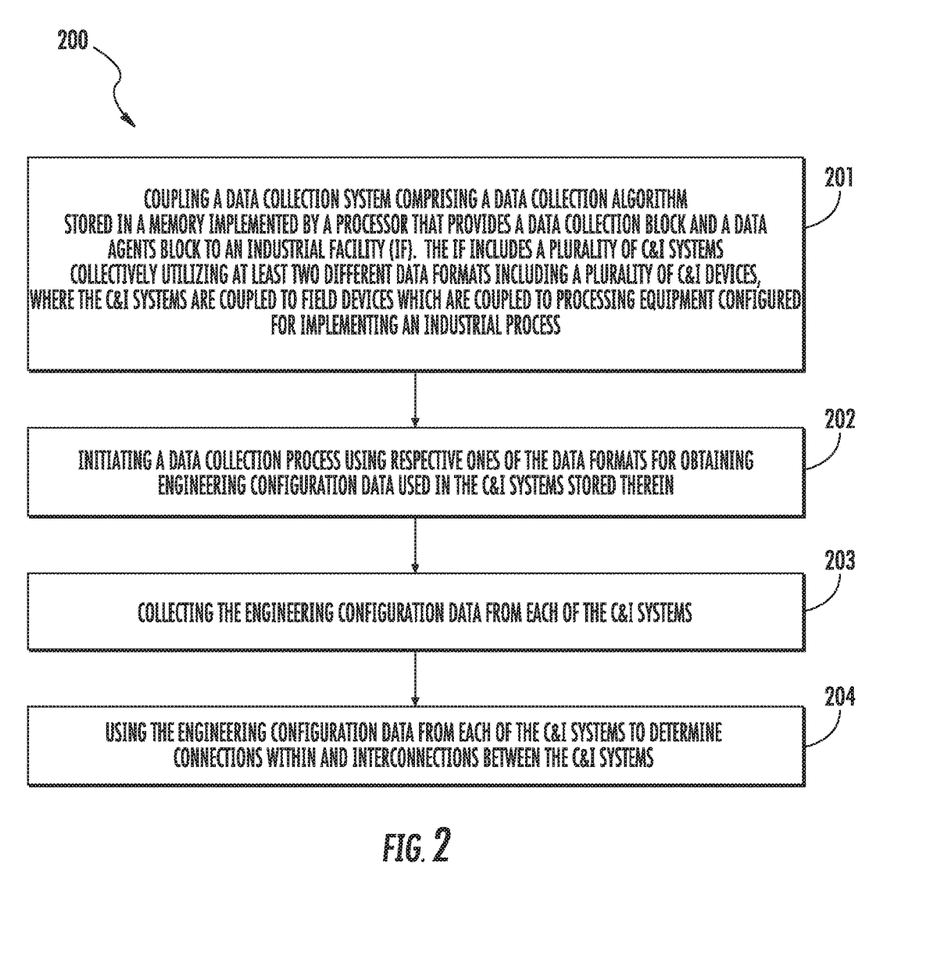
FIG. 2 is a flow chart for an example method of automatically determining interconnections between C&I systems within an IF, according to an example embodiment.

FIG. 2 is a flow chart for an example method 200 of automatically determining interconnections between C&I systems within an IF, according to an example embodiment. Step 201 comprises coupling a data collection system comprising a data collection algorithm stored in a memory implemented by a processor that provides a data collection block (e.g., data collection block 120 in FIG. 1) and a data agent block (e.g., data agents block 110 in FIG. 1) to an IF (e.g., IF 105 in FIG. 1). The IF includes a plurality of C&I systems collectively utilizing at least two different data formats including a plurality of C&I devices, where the C&I systems are coupled to field devices which are coupled to processing equipment configured for implementing an industrial process.

The data collection system executes steps 202 to 204 along with optional steps 205 and 206. Step 202 comprises initiating a data collection process using respective ones of the data formats for obtaining engineering configuration data used in the C&I systems stored therein. Step 203 comprises collecting the engineering configuration data from each of the C&I systems stored therein. Step 204 comprises using the engineering configuration data from each of the C&I systems determine connections within and interconnections between the C&I systems. The connections and interconnections generally include both logical connections and physical connections.

Step 205 comprises converting a format of the engineering configuration data to generate common format engineering configuration data. Step 206 comprises storing the common format engineering configuration data in a common information system along with a timestamp. From the stored engineering configuration data a change record can be extracted which provides a mechanism to view the interconnection change history and associated reasons and description of the changes. The method can also include generating screen views including a graphical view and a tabular view.

The method can further comprise utilizing the interconnections between C&I systems for maintenance C&I devices, a replacement of one of the C&I devices, or a trip analysis in the IF. During replacement and maintenance of the logic/device/controller/wiring the data flow and interconnections can be used to helps in identifying the impact. A trip is basically a failure in the plant and trip analysis is the activity to determine the reason for the failure. The interconnections help in identifying input and output data flow for the failed device/logic. The system also has a navigation capability to explore the connections to the next connected block. These features help in performing the trip analysis.

EXAMPLES

Disclosed embodiments are further illustrated by the following specific Examples, which should not be construed as limiting the scope or content of this Disclosure in any way.

Figure 3A:
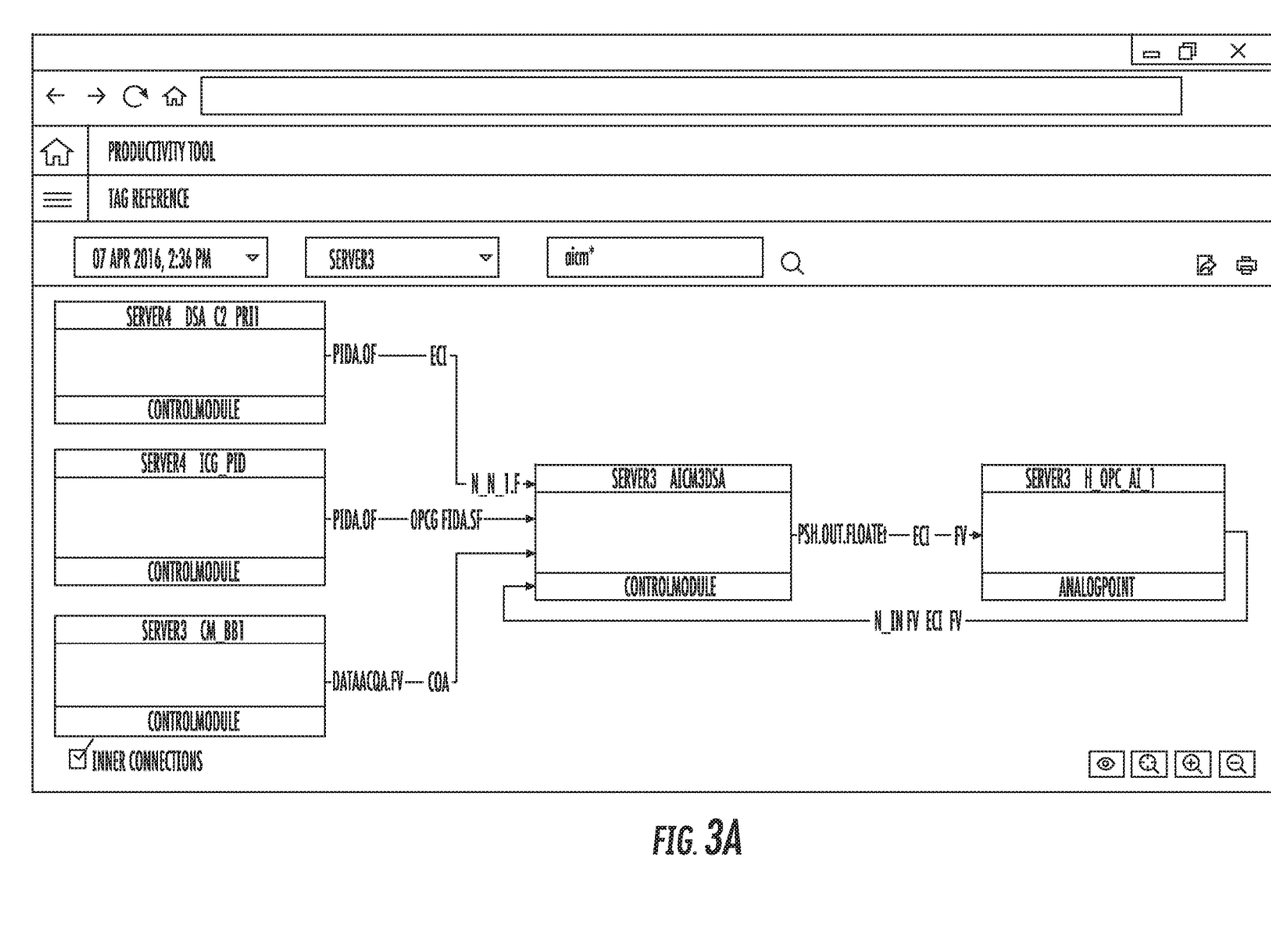
FIGS. 3A and 3B is a first scanned example screenshot showing screens generated by a disclosed data collection system with a graphical view and tabular view, respectively, depicting the references generated for a user' search for an object shown as "server 3" using a tag reference search with "aicm*" being the tag identifier including a wildcard (*) shown near the center of the display, with the system output search results showing the logic tag "AICM3DSA" along with its interconnection, where no internal logic is shown.
Figure 3B:
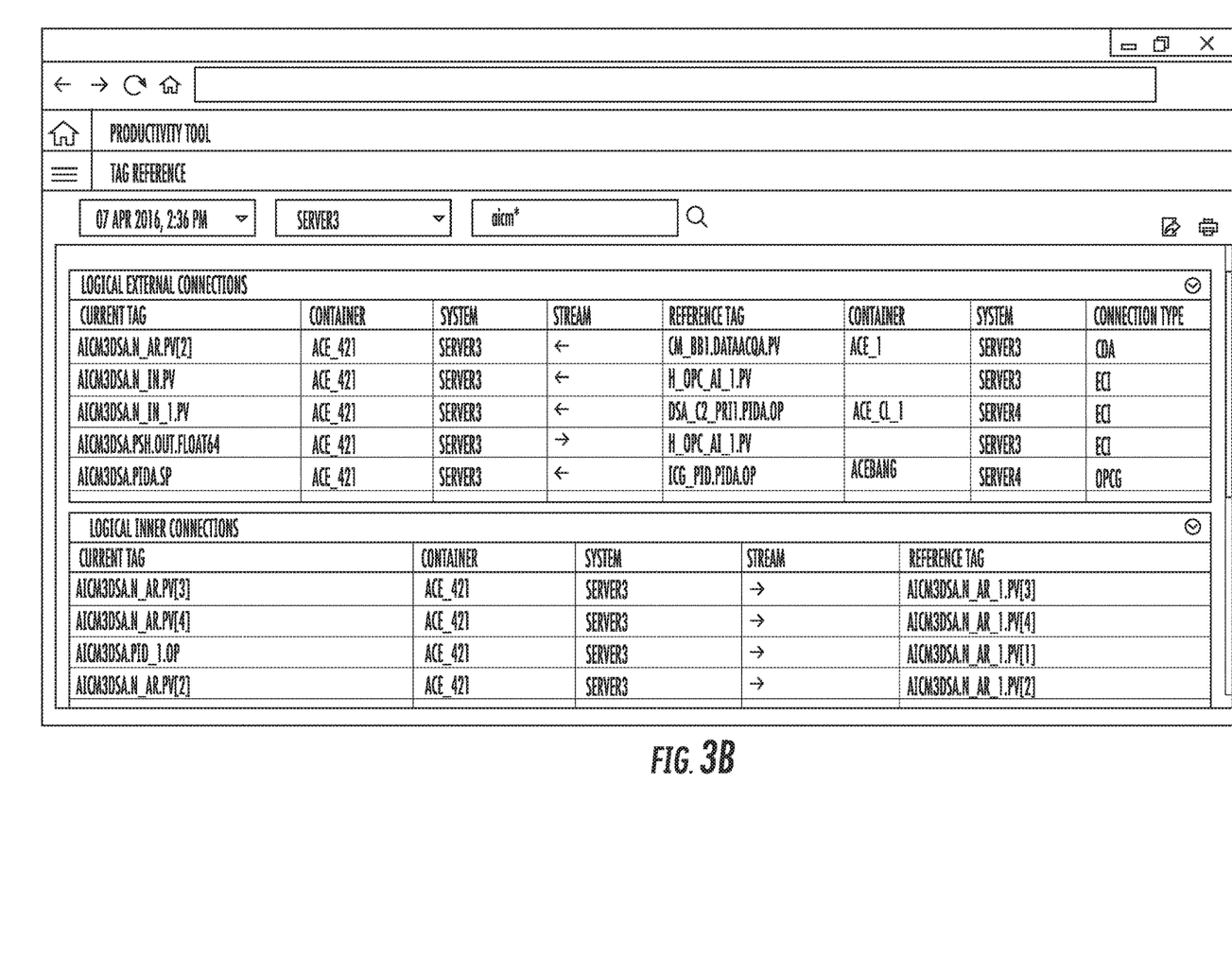

FIGS. 3A and 3B are scanned screenshots generated by a disclosed data collection system showing a graphical view and tabular view, respectively, depicting the references generated by a disclosed data collection system responsive to a user' search for an object shown as "server 3" using a TR search with "aicm*" being the tag identifier of server 3. The logic tag search result "AICM3DSA" is shown identified. No internal logic is shown in FIG. 3A. The tabular view in FIG. 3B shows the logic tag "AICM3DSA" shown in FIG. 3A being expanded showing its internal logic blocks along with their interconnections, in addition to some references in display files, and history references, that are all not shown in the graphical view of FIG. 3A.

Figure 3C:
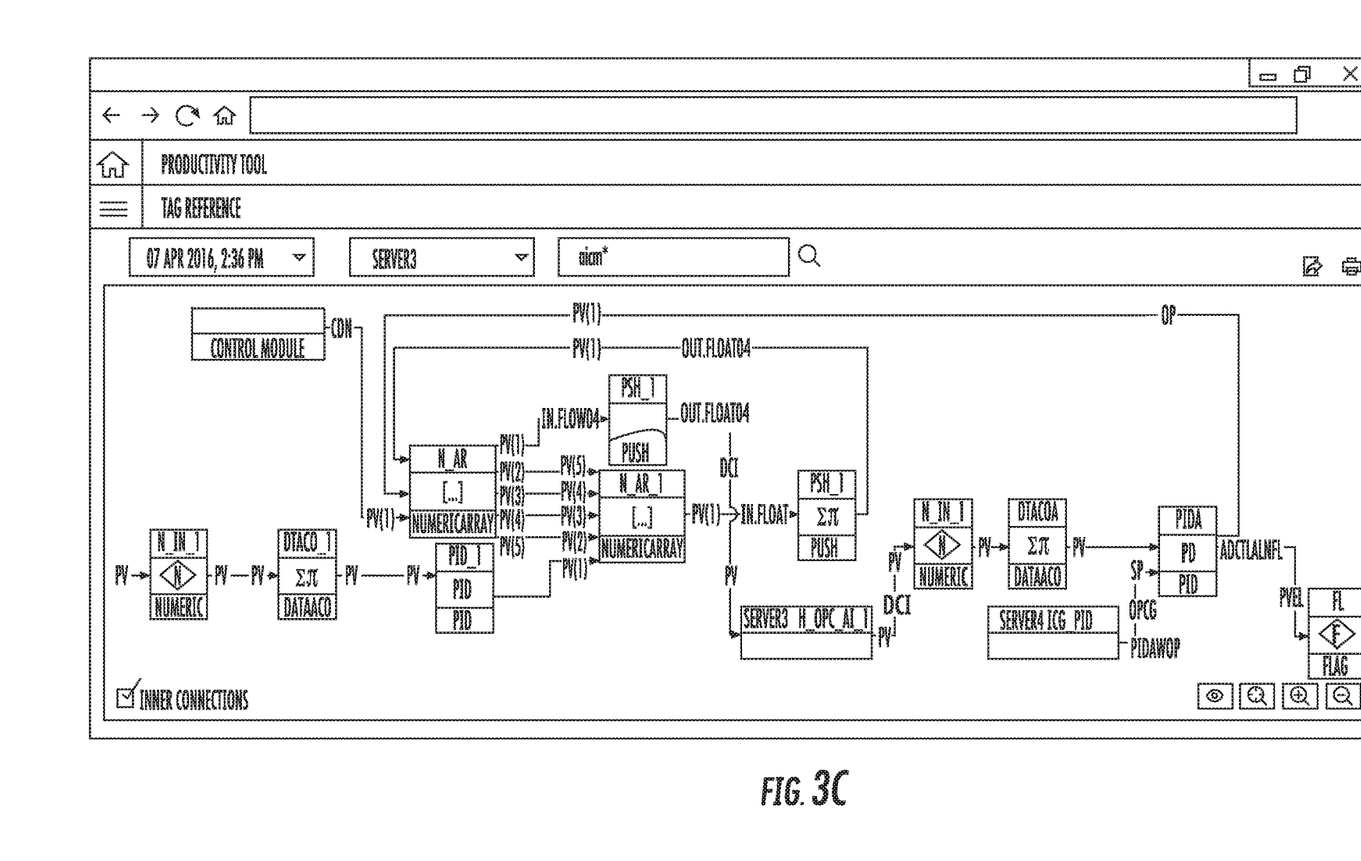
FIGS. 3C and 3D is a second scanned example screenshot showing screens generated by a disclosed data collection system with a graphical view and tabular view, respectively, depicting the references after the logic tag "AICM3DSA" search result in FIG. 3A is expanded showing internal logic blocks along with their interconnections.
Figure 3D:
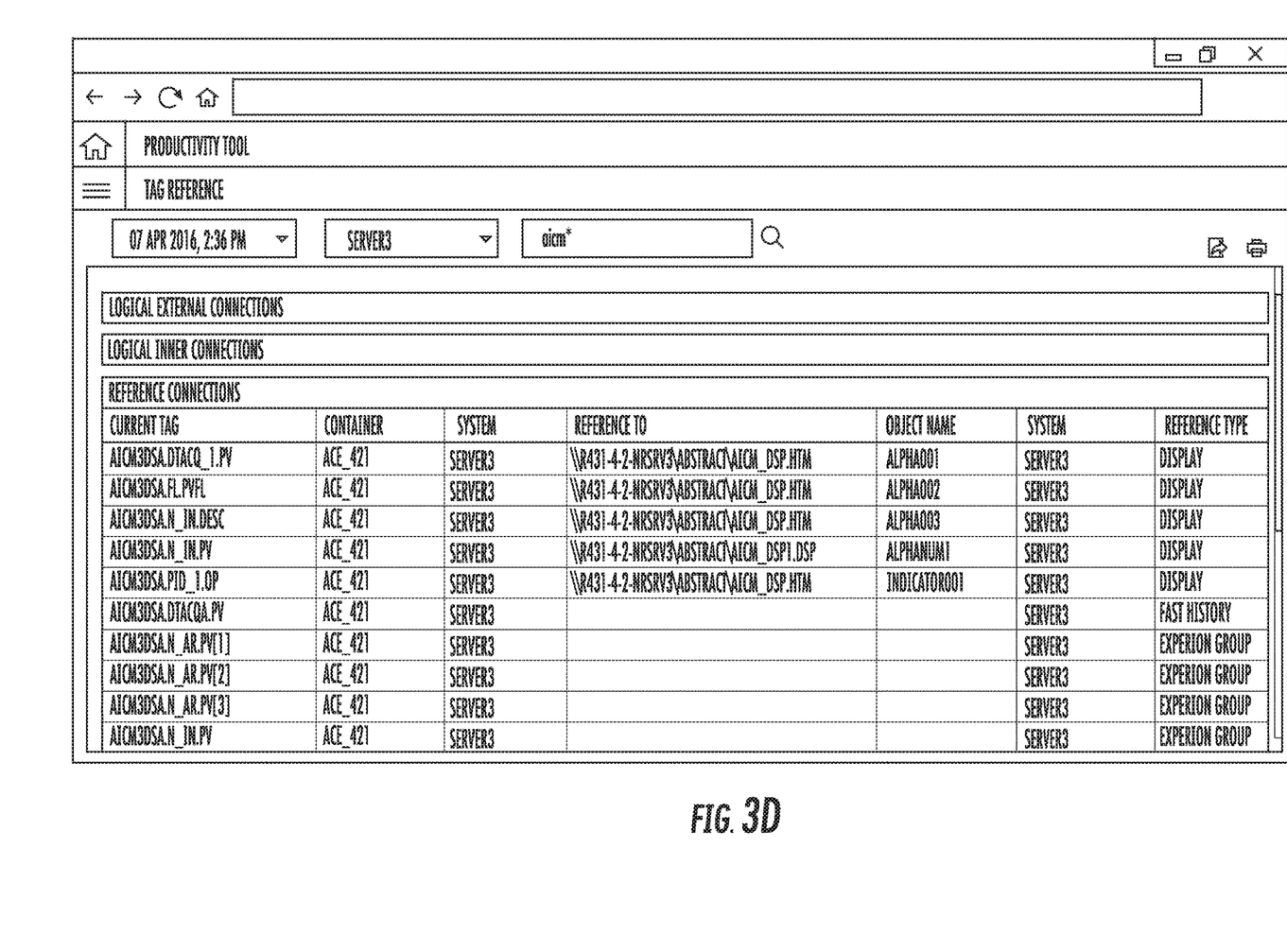

FIGS. 3C and 3D is a second scanned example screenshot showing screens generated by a disclosed data collection system depicting the references after the logic tag "AICM3DSA" search result in FIG. 3A is expanded showing internal logic blocks along with their interconnections. Upstream and downstream connotations describe the ends of the connections for server 3 in this example. The left block in the connection is called upstream and right block is called downstream. Data flows from upstream to downstream as shown in the graphical view. The upstream and downstream ends have additional details such as the system, controller and area that helps a user to understand and locate the end involved in the connection. Although not shown, the attributes in the views provide additional information about the connection attributes including the protocol (Modbus, OPC, CDA, ICG, communication medium (Ethernet, Wireless), and rate of data exchange (such as 100 MBPS, or 1 GBPS). Navigation is provided to the user from the upstream or downstream end to identify the connections respective ends involved. Pinning of certain blocks and connections is provided to ensure that those blocks are always shown during user' navigation. Pinning means that the location of block is fixed in the view and even during the navigation it remains fixed.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of determining interconnections between control and instrumentation (C&I) systems within an industrial facility (IF), comprising:
coupling a data collection system comprising a data collection algorithm stored in a memory implemented by a data server comprising a processor that provides a data collection block and a data agents block to said IF, said IF including a plurality of C&I systems collectively utilizing at least two different data formats each including a plurality of C&I devices comprising at least one process controller, at least one network interface module, and at least one input/output (I/O) device coupled to field devices which are coupled to processing equipment configured for implementing an industrial process,
said data collection system automatically:
initiating a data collection process using respective ones of said data formats used in said C&I systems for obtaining engineering configuration data including from said process controller, said network interface module, and said I/O device, and a network configuration comprising a network type and a communication method used in said C&I systems stored in said plurality of C&I systems;
collecting said engineering configuration data received from each of said C&I systems comprising three connection resolution passes for resolving unresolved connections, including:
pass 1 for resolving first connections where both ends are within a single one of said plurality of C&I systems, and wherein tags associated with said both ends are located using additional information added for said unresolved connections including at least one of a communication protocol, physical medium, and rate of data transfer;

pass 2 after said pass 1 for resolving second connections between two different ones of said plurality of C&I systems, using separate processing logic to identify and resolve connection ends for said second connections accounting for internal organization of said second connections, and a connection type, and pass 3 after said pass 2 connection for resolving third connections that are between two different C&I systems using a recursive loop which continues until said third connections are fully resolved with end tags or it is determined at least one end cannot be resolved, and using said engineering configuration data from each of said C&I systems to determine connections within said C&I systems and interconnections between said C&I systems.

2. The method of claim 1, further comprising converting a format of said engineering configuration data to generate common format engineering configuration data and storing said common format engineering configuration data in a common information system along with a timestamp.

3. The method of claim 1, wherein said interconnections between said C&I systems include both logical connections and physical interconnections.

4. The method of claim 1, wherein said collecting said engineering configuration data from each of said C&I systems comprises using a plurality of data agents that are each compatible with an operating system of a respective one of said plurality of C&I systems they are associated with.

5. The method of claim 1, further comprising utilizing said interconnections between said C&I systems for maintenance one of said plurality of C&I devices, a replacement of one of said plurality of C&I devices, or a trip analysis in said IF.

6. The method of claim 1, further comprising tag reference (TR) searching a selected one of said plurality of C&I devices (selected C&I device) for generating a graphical view showing said connections associated with said selected C&I device.

7. The method of claim 1, wherein said connections and said interconnections include both logical and physical connections.

8. A computer program product, comprising:

a non-transitory data storage medium that includes program instructions executable by a processor to enable said processor to execute a method of determining interconnections between control and instrumentation (C&I) systems within an industrial facility (IF) that includes a plurality of C&I systems collectively utilizing at least two different data formats and including a plurality of C&I devices comprising at least one process controller, at least one network interface module, and at least one input/output (I/O) device being coupled to field devices which are coupled to processing equipment configured for implementing an industrial process, said method automatically:

coupling a data collection system comprising a data collection algorithm stored in a memory implemented by a data server comprising a processor that provides a data collection block and a data agents block to said IF, said data collection algorithm:

initiating a data collection process using respective ones of said data formats for obtaining engineering configuration data including from said process controller, said network interface module, and said I/O device, and a network configuration comprising a network type and a communication method used in said C&I systems stored therein;

collecting said engineering configuration data from each of said C&I systems comprising three connection resolution passes for resolving unresolved connections, including:

pass 1 for resolving first connections where both ends are within a single one of said plurality of C&I systems, and wherein tags associated with said both ends are located using additional information added for said unresolved connections including at least one of a communication protocol, physical medium, and rate of data transfer;

pass 2 after said pass 1 for resolving second connections between two different ones of said plurality of C&I systems, using separate processing logic to identify and resolve connection ends for said second connections accounting for internal organization of said second connections, and a connection type, and pass 3 after said pass 2 connection for resolving third connections that are between two different C&I systems using a recursive loop which continues until said third connections are fully resolved with end tags or it is determined at least one end cannot be resolved, and using said engineering configuration data from each of said C&I systems to determine connections within said C&I systems and interconnections between said C&I systems.

9. The computer program product of claim 8, further comprising converting a format of said engineering configuration data to generate common format engineering configuration data, and storing said common format engineering configuration data in a common information system along with a timestamp.

10. The computer program product of claim 8, wherein said interconnections between said C&I systems include both logical connections and physical interconnections.

11. The computer program product of claim 8, wherein said collecting said engineering configuration data from each of said C&I systems comprises using a plurality of data agents that are each compatible with an operating system of a respective one of said plurality C&I systems they are associated with.

12. The computer program product of claim 8, further comprising utilizing said interconnections between said C&I systems for maintenance one of said plurality of C&I devices, a replacement of one of said plurality of C&I devices, or a trip analysis in said IF.

13. The computer program product of claim 8, further comprising tag reference (TR) searching a selected one of said plurality of C&I devices (selected C&I device) for generating a graphical view showing said interconnections associated with said selected C&I device.

14. The computer program product of claim 8, wherein said connections and said interconnections include both logical and physical connections.

* * * * *